(12) United States Patent
Bose et al.

(10) Patent No.: US 9,921,639 B2
(45) Date of Patent: *Mar. 20, 2018

(54) CLUSTERING EXECUTION IN A PROCESSING SYSTEM TO INCREASE POWER SAVINGS

(71) Applicant: International Business Machines Corporation, Armonk, NY (US)

(72) Inventors: Pradip Bose, Yorktown Heights, NY (US); Alper Buyuktosunoglu, White Plains, NY (US); Hans M. Jacobson, White Plains, NY (US); Augusto J. Vega, Barcelona (ES)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 56 days.

This patent is subject to a terminal disclaimer.

(21) Appl. No.: 14/749,942

(22) Filed: Jun. 25, 2015

(65) Prior Publication Data

US 2016/0378161 A1    Dec. 29, 2016

(51) Int. Cl.
  *G06F 1/26*  (2006.01)
  *G06F 1/32*  (2006.01)

(52) U.S. Cl.
  CPC ........... *G06F 1/329* (2013.01); *Y02B 60/144* (2013.01); *Y02B 60/32* (2013.01)

(58) Field of Classification Search
  CPC ....... G06F 1/329; G06F 1/3228; Y02B 60/10; Y02B 60/12
  USPC .......................................... 713/320; 718/102
  See application file for complete search history.

(56) References Cited

U.S. PATENT DOCUMENTS

| | | | |
|---|---|---|---|
| 6,381,739 B1 * | 4/2002 | Breternitz, Jr. ..... | G06F 11/3612 714/37 |
| 6,732,284 B2 | 5/2004 | Watts, Jr. et al. | |
| 8,497,702 B2 | 7/2013 | Hill et al. | |
| 2005/0094730 A1 * | 5/2005 | Chang .............. | H04N 21/43637 375/240.17 |
| 2005/0097378 A1 | 5/2005 | Hwang | |

(Continued)

FOREIGN PATENT DOCUMENTS

EP    1164460    12/2001

OTHER PUBLICATIONS

T Hamano, et al., "Power-Aware Dynamic Task Scheduling for Heterogeneous Accelerated Clusters," IEEE International Symposium on Parallel & Distributed Processing, May 2009, 8 pages.

(Continued)

*Primary Examiner* — Nitin C Patel
(74) *Attorney, Agent, or Firm* — Cantor Colburn LLP

(57) ABSTRACT

Embodiments relate to clustering execution in a processing system. An aspect includes accessing a control flow graph that defines a data dependency and an execution sequence of a plurality of tasks of an application that executes on a plurality of system components. The execution sequence of the tasks in the control flow graph is modified as a clustered control flow graph that clusters active and idle phases of a system component while maintaining the data dependency. The clustered control flow graph is sent to an operating system, where the operating system utilizes the clustered control flow graph for scheduling the tasks.

13 Claims, 8 Drawing Sheets

(56) References Cited

U.S. PATENT DOCUMENTS

| | | | | |
|---|---|---|---|---|
| 2007/0157044 | A1* | 7/2007 | You | G06F 1/3203 713/320 |
| 2008/0256376 | A1* | 10/2008 | You | G06F 1/3203 713/324 |
| 2010/0269102 | A1* | 10/2010 | Latorre | G06F 9/3842 717/130 |
| 2011/0271127 | A1* | 11/2011 | Thabet | G06F 1/3203 713/320 |
| 2012/0254887 | A1* | 10/2012 | Rodriguez | G06F 17/30433 718/106 |
| 2013/0232495 | A1* | 9/2013 | Rossbach | G06F 9/5038 718/102 |
| 2014/0089699 | A1 | 3/2014 | O'Connor et al. | |
| 2014/0208138 | A1 | 7/2014 | Homchaudhuri et al. | |
| 2014/0333638 | A1 | 11/2014 | Kaminski et al. | |

OTHER PUBLICATIONS

List of IBM Patents or Patent Applications Treated as Related, Jan. 14, 2015, 2 pages.
U.S. Appl. No. 14/953,705, filed Nov. 30, 2015, Entitled: Clustering Execution in a Processing System to Increase Power Savings, First Named Inventor: Pradip Bose.

\* cited by examiner

800

[802] ACCESS A CONTROL FLOW GRAPH THAT DEFINES A DATA DEPENDENCY AND AN EXECUTION SEQUENCE OF A PLURALITY OF TASKS OF AN APPLICATION THAT EXECUTES ON A PLURALITY OF SYSTEM COMPONENTS

↓

[804] MODIFY THE EXECUTION SEQUENCE OF THE TASKS IN THE CONTROL FLOW GRAPH AS A CLUSTERED CONTROL FLOW GRAPH THAT CLUSTERS ACTIVE AND IDLE PHASES OF A SYSTEM COMPONENT WHILE MAINTAINING THE DATA DEPENDENCY

↓

[806] SEND THE CLUSTERED CONTROL FLOW GRAPH TO AN OPERATING SYSTEM, WHERE THE OPERATING SYSTEM UTILIZES THE CLUSTERED CONTROL FLOW GRAPH FOR SCHEDULING THE TASKS

*FIG. 8*

CLUSTERING EXECUTION IN A PROCESSING SYSTEM TO INCREASE POWER SAVINGS

STATEMENT REGARDING FEDERALLY SPONSORED RESEARCH OR DEVELOPMENT

This invention was made with Government support under contract number B599858 awarded by the Department of Energy. The Government has certain rights in this invention.

BACKGROUND

The present application relates generally to computer systems, and more specifically, to clustering execution of tasks in a processing system in order to increase power savings potential.

In computer systems with multiple interconnected components (e.g., processors, accelerators, memory) it is often the case that some components are busy while others are idle. A standard method of reducing power usage by components during inactive intervals is to use power gating to activate sleep or power down modes. According to this method, the logic is built of low-threshold transistors, with high-threshold transistors serving as a footer or header to cut leakage during the quiescence intervals. During normal operation mode, the circuits achieve high performance, resulting from the use of low-threshold transistors. During sleep mode, high threshold footer or header transistors are used to cut off leakage paths, reducing the leakage currents by orders of magnitude.

A general drawback associated with such techniques of power savings is that periods of idleness for a given resource (e.g., a processor or an accelerator chip) are often not long enough to support the overhead associated with activating and deactivating the power savings technique, even when the fraction of idle cycles relative to the total number of execution cycles is rather large.

SUMMARY

Embodiments include systems and computer program products for clustering execution in a processing system. A control flow graph is accessed that defines a data dependency and an execution sequence of a plurality of tasks of an application that executes on a plurality of system components. The execution sequence of the tasks in the control flow graph is modified as a clustered control flow graph that clusters active and idle phases of a system component while maintaining the data dependency. The clustered control flow graph is sent to an operating system, where the operating system utilizes the clustered control flow graph for scheduling the tasks.

Additional features and advantages are realized through the techniques of the present embodiment. Other embodiments and aspects are described herein and are considered a part of the claimed invention. For a better understanding of the invention with the advantages and features, refer to the description and to the drawings.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 8 illustrates a process of clustering execution of tasks in a processing system in accordance with an embodiment.

DETAILED DESCRIPTION

Embodiments relate to clustering execution of tasks in a processing system in order to increase power gating efficiency. In an embodiment, the tasks that target different system components are clustered to group active and idle phases such that the idle phases are sufficiently long in duration to enable higher overhead power savings techniques to be implemented. For example, in a scenario where a main processor is a general purpose multi-core chip ("G") that works in cooperation with one or more accelerator chips (i.e., off-load compute engines) "A", opportunities of gating at the level of the G-chip or A-chip are significantly curtailed if the transfer of control from G-to-A and A-to-G are too frequent, i.e., if the idle duration lengths on the G-chip or the A-chip are both small. For instance, suppose on average, G is idle 50% of the total execution cycles and A is idle 50% of the total execution cycles. Further suppose that utilization is measured in granularities of time T=50 cycles, where 50 cycles is the minimum time interval of fully utilized invocation of A. Then, a utilization sequence of GAGAGA GA . . . over a long period of execution (e.g., millions of cycles), where each G or A utilization sequence is only 50 cycles, would not be amenable for power gating of either G or A, even though individually the G and A resources are each utilized only 50% of the time. In exemplary embodiments, the execution sequence can be changed to something like: GGGGGAAAAAGGGGGAAAAA . . . (without affecting net performance) where there are 250 cycles of idle duration on the G or A side (when an idle period starts), that provide practical, low overhead opportunities for power gating on both the G and the A sides.

Figure 1:
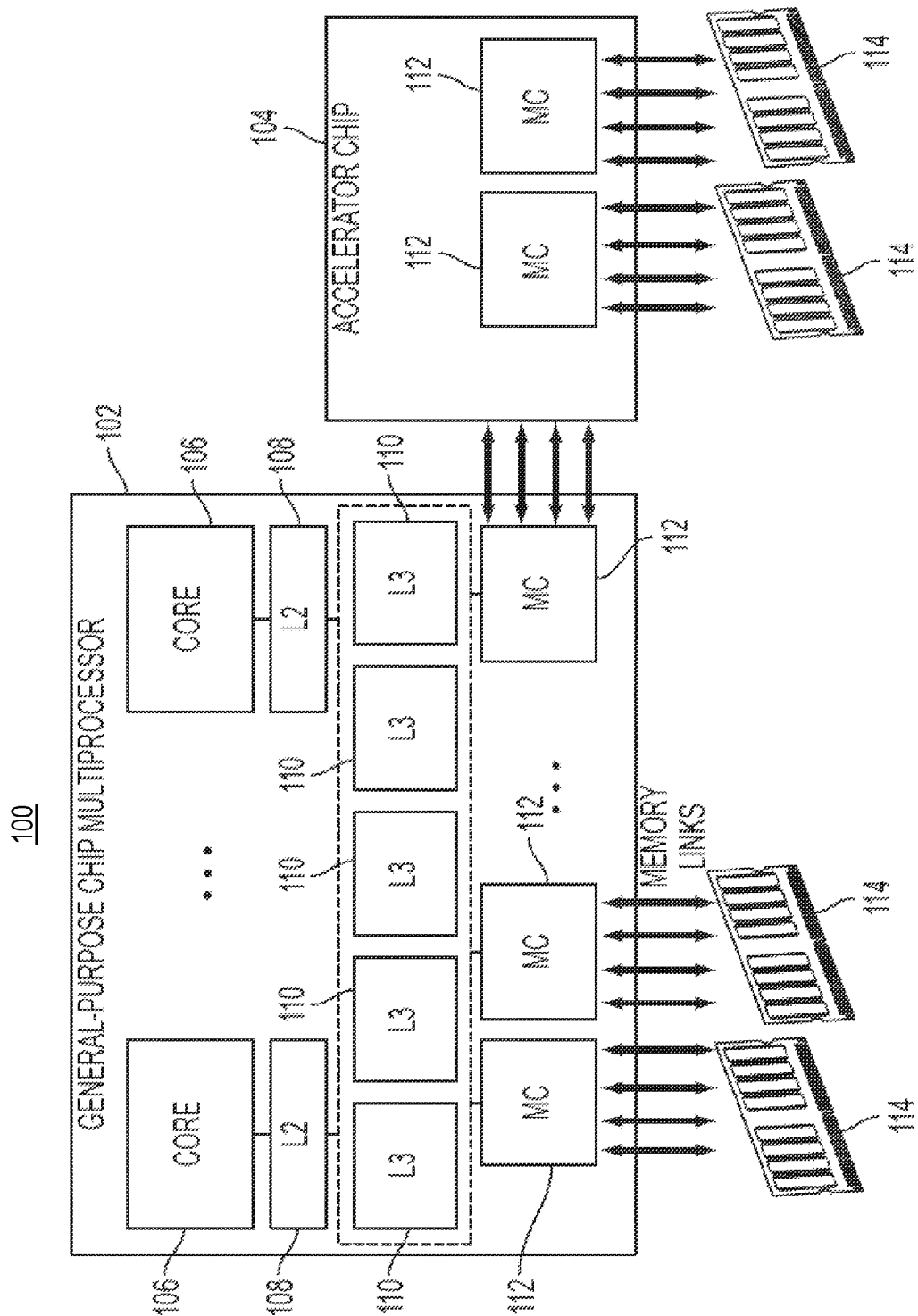
FIG. 1 illustrates a block diagram of a system in accordance with an embodiment.

Referring now to FIG. 1, a block diagram of a computer system 100 in accordance with embodiments is generally shown. The computer system 100 includes a main processor 102, an accelerator chip 104, and memory devices 114. As used herein, the term "chip" refers to an integrated circuit, i.e., a set of electronic circuits on one small plate (chip) of semiconductor material (e.g., silicon). As shown in FIG. 1, the main processor 102 can include one or more cores 106 (also referred to as "core processors") and corresponding level two (L2) caches 108, one or more level three (L3) caches 110, and one or more memory controllers 112. The memory controller 112 can connect to the memory devices 114 and the accelerator chip 104 via one or more memory links. The main processor 102 shown in FIG. 1 is a multi-core processor that is implemented by a single computing component with two or more independent actual central processing units (CPUs) (referred to as "cores 106" in FIG. 1). The cores 106 can include level one (L1) cache, and they can read and execute program instructions (e.g. via execution units). The instructions can include ordinary CPU instructions such as add, move data, and branch, but the multiple cores 106 can run multiple instructions at the same time, increasing overall speed for programs amenable to parallel processing. Embodiments described herein can be implemented by program instructions executing on the main processor 102. The main processor 102 is also referred to as a general-purpose multi-core chip or "G chip".

As shown in FIG. 1, the accelerator chip 104 (also referred to as an "A chip") can be implemented, for example, by a hybrid memory cube (HMC). In an alternate embodiment, the accelerator chip 104 is a co-processor, such as a graphics processor, digital signal processor, or other supporting structure comprising at least one execution unit. The accelerator chip 104 can include memory controllers 112 that are connected, via memory links to memory devices 114.

The memory devices 114 can be implemented by, but are not limited to: a combination of various types of computer readable storage media, such as a hard disk, a random access memory (RAM), a read-only memory (ROM), an erasable programmable read-only memory (EPROM or Flash memory), an optical fiber, and the like, to store executable instructions and associated data.

Figure 2:
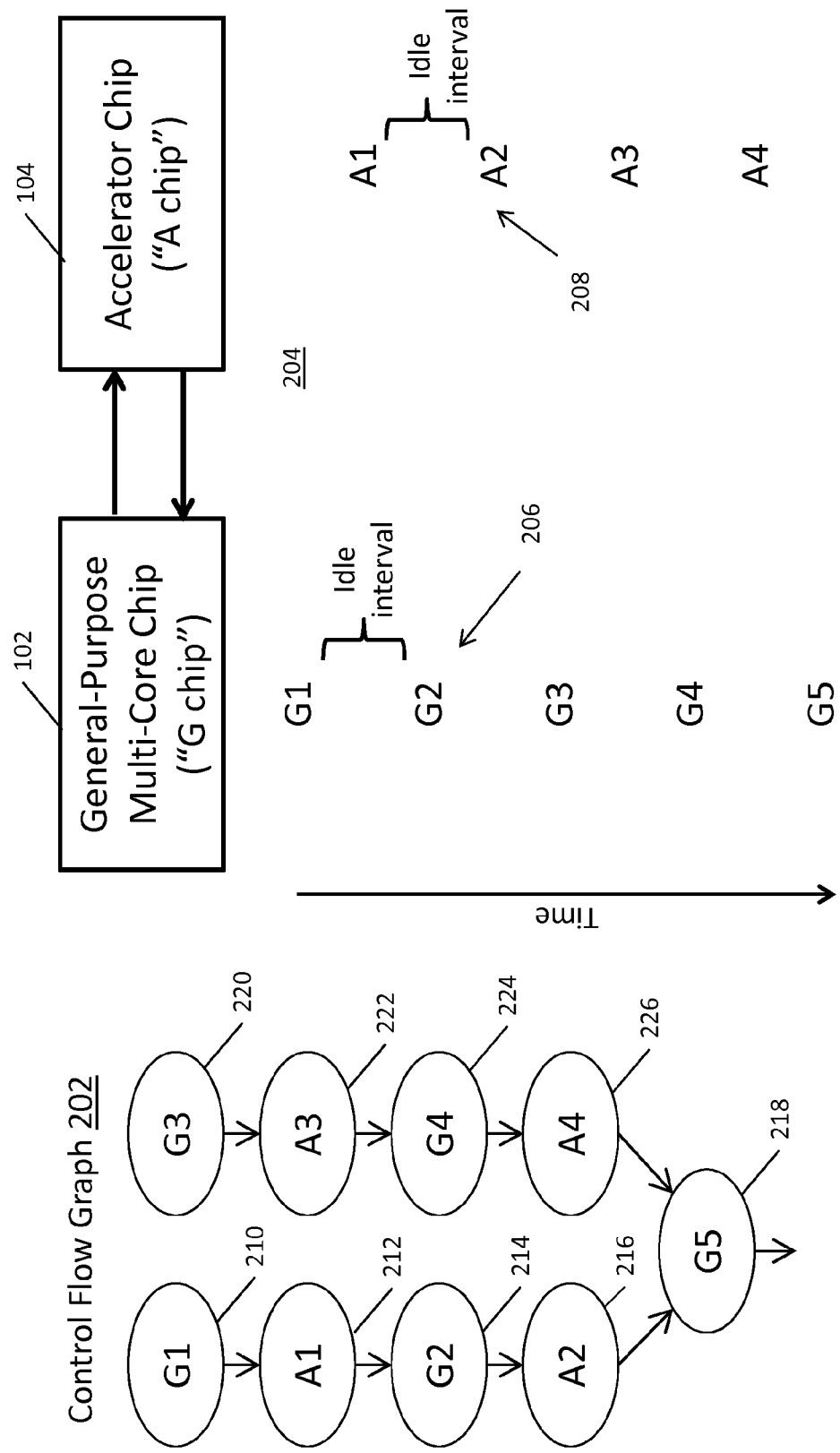
FIG. 2 illustrates a block diagram of a control flow graph and an execution sequence of tasks in accordance with an embodiment.

Referring now to FIG. 2, a block diagram of a control flow graph 202 and an execution sequence 204 of tasks are depicted in accordance with embodiments. The tasks in the execution sequence 204 are divided into general-purpose tasks 206 to be executed by the main processor 102 and accelerator tasks 208 to be executed by the accelerator chip 104. In general, while a general-purpose task 206 is executing on the main processor 102 in an active phase, the accelerator chip 104 is in an idle interval or phase. Similarly, while an accelerator task 208 is executing on the accelerator chip 104 in an active phase, the main processor 102 is in an idle interval or phase. In the example of FIG. 2, the execution sequence 204 includes the general-purpose tasks 206 ordered as G1, G2, G3, G4, and G5 interleaved with the accelerator tasks 208 ordered as A1, A2, A3, and A4. The control flow graph 202 defines a data dependency and an execution sequence of the general-purpose tasks 206 and the accelerator tasks 208 relative to each other such that an operating system of the computer system 100 of FIG. 1 can schedule the tasks.

The control flow graph 202 indicates that G1 is a parent task 210 of A1, A1 is a parent task 212 of G2, G2 is a parent task 214 of A2, A2 is a parent task 216 of G5, and G5 is a last task 218. The control flow graph 202 also indicates that G3 is a parent task 220 of A3, A3 is a parent task 222 of G4, G4 is a parent task 224 of A4, and A4 is a parent task 226 of G5. Thus, the last task 218 of G5 is dependent upon data from two parent tasks 216 and 226 (i.e., A2 and A4). When the control flow graph 202 is traversed from the last task 218 upward to parent tasks on a stepwise basis, it can be determined which tasks are at a same step such that the tasks aligned at the same step can be clustered. For example, tasks A2 and A4 are at a same step (i.e., both immediate parent tasks 216, 226 of G5), tasks G2 and G4 are at a same step, tasks A1 and A3 are at a same step, and tasks G1 and G3 are at a same step. The clustering at each step is reflected in the resulting clustered control flow graph 302 of FIG. 3.

Figure 3:
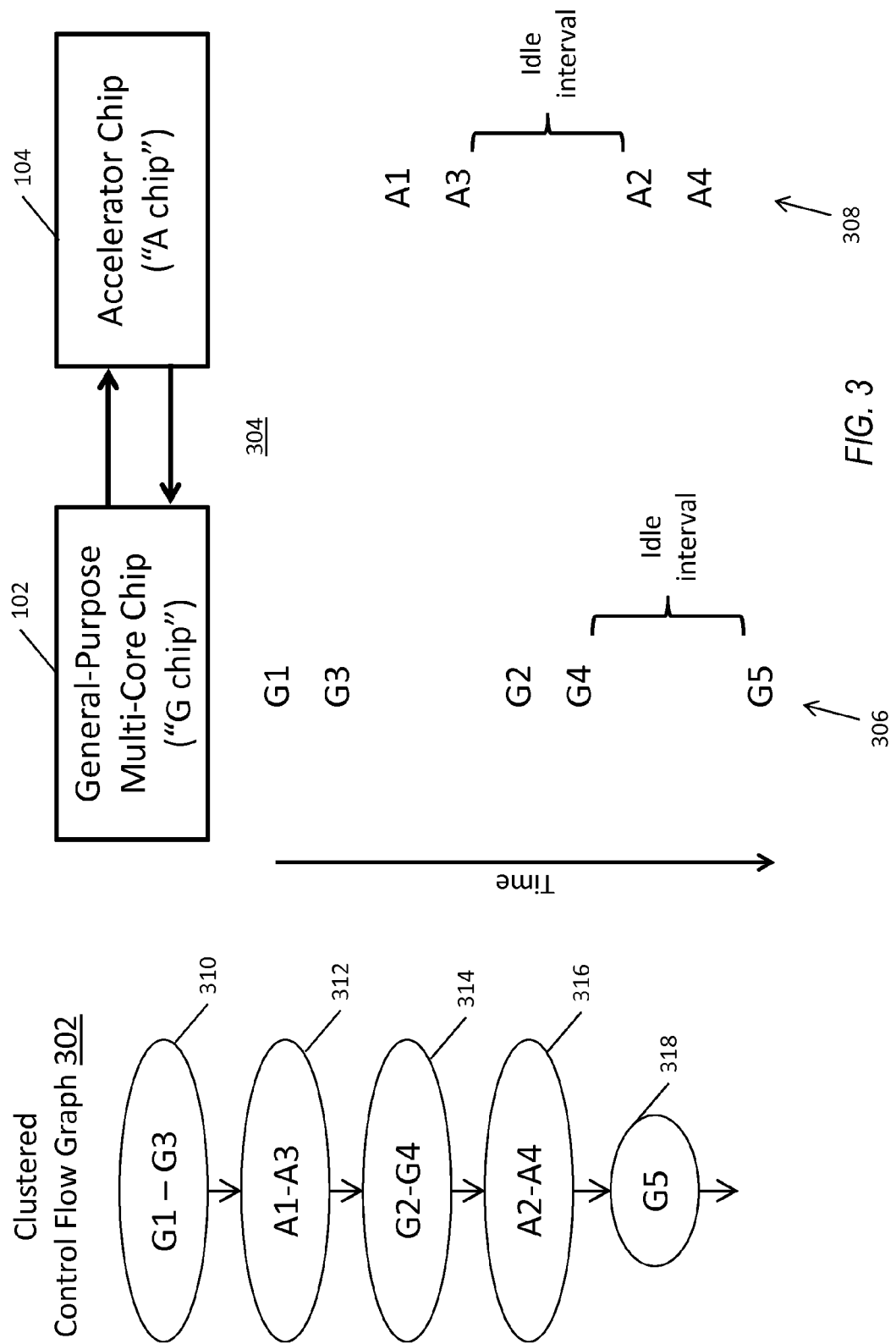
FIG. 3 illustrates a block diagram of a clustered control flow graph and a modified execution sequence of tasks in accordance with an embodiment.

As depicted in FIG. 3, the clustered control flow graph 302 includes steps 310, 312, 314, 316, and 318. Step 310 includes G1 and G3 and is performed prior to step 312. Step 312 includes A1 and A3 and is performed prior to step 314. Step 314 includes G2 and G4 and is performed prior to step 316. Step 316 includes A2 and A4 and is performed prior to step 318. Step 318 is the last step and includes G5. The clustered control flow graph 302 results in a modified execution sequence 304, where a general-purpose task list 306 defines an order of instances of general-purpose tasks 206 as G1, G3, G2, G4, and G5. The modified execution sequence 304 also includes an accelerator task list 308 that defines an order of instances of accelerator tasks 208 as A1, A3, A2, and A4. Execution of the tasks in the general-purpose task list 306 and the accelerator task list 308 can alternate such that data dependency is maintained. During execution of tasks in steps 310 and 314, the accelerator chip 104 has an extended idle interval. Similarly, during execution of tasks in steps 312 and 316, the main processor 102 has an extended idle interval. These extended idle intervals, as compared to FIG. 2, can enable power savings opportunities that may not otherwise be achieved using the execution sequence 204 of FIG. 2.

Figure 5:
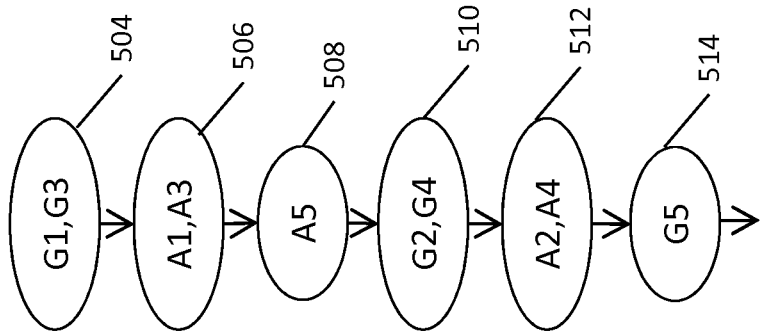
FIG. 5 illustrates another example of a clustered control flow graph in accordance with an embodiment.
Figure 4:
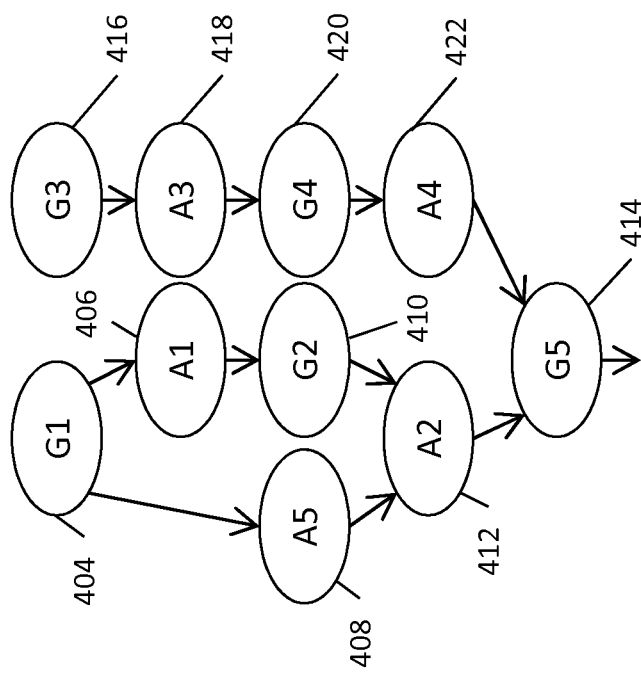
FIG. 4 illustrates another example of a control flow graph in accordance with an embodiment.

Turning now to FIG. 4, another example of a control flow graph 402 is illustrated in accordance with an embodiment, and FIG. 5 illustrates another example of a clustered control flow graph 502 based on the control flow graph 402 of FIG. 4. In control flow graph 402, G1 is a parent task 404 of both A1 and A5. A1 is a parent task 406 of G2, and A5 is a parent task 408 of A2. G2 is also a parent task 410 of A2. A2 is a parent task 412 of G5, where G5 is a last task 414 of the control flow graph 402. Additionally in control flow graph 402, G3 is a parent task 416 of A3, and A3 is a parent task 418 of G4. G4 is a parent task 420 of A4, and A4 is a parent task 422 of G5. To traverse the control flow graph 402 and produce the clustered control flow graph 502, the following pseudo-code of Table 1 can be implemented. The pseudo-code of Table 1 can also be applied to the control flow graph 202 of FIG. 2 to generate the clustered control flow graph 302 of FIG. 3.

TABLE 1

Pseudo-code for generating a clustered control flow graph

| Line No. | Action |
| --- | --- |
| 1 | curr_step_tasks.push (CFG.get_last( ) ) |
| 2 | WHILE curr_step_tasks.size > 0 |
| 3 |   FOR EACH task IN curr_step_tasks |
| 4 |     CLASSIFY(task) |
| 5 |     parents.push( task.get_parents( ) ) |
| 6 |   END FOR EACH |
| 7 |   curr_step_tasks <- parents |
| 8 |   parents <- ( ) |
| 9 | END WHILE |

At line 1 of Table 1 with respect to control flow graph 402, a current step is assigned as the last task 414. At line 2 of Table 1, a while-loop establishes a number of iterations based on the size (i.e., number of steps) between the earliest tasks (G1, G3) of the control flow graph 402 and the last task 414. At line 3 of Table 1, a for-loop analyzes each task at the current step. At line 4 of Table 1, the current task is classified as a general-purpose task or an accelerator task. At line 5 of Table 1, the parent task or tasks of the current task are determined. At line 6 of Table 1, the for-loop iterates. At line 7 of Table 1, the one or more parent tasks become the current step. At line 8 of Table 1, the parent task designation is reset for the next loop iteration. At line 9 of Table 1, the while-loop iterates. The pseudo-code for generating a clustered control flow graph can result in recursively generating a general-purpose task list including each instance of the general-purpose task and an accelerator task list including each instance of the accelerator task by setting each of the one or more parent tasks as the current task and repeating the classifying and the determining of the one or more parent tasks until all of the tasks of the control flow graph are analyzed.

In the example of FIGS. 4 and 5, upon applying the algorithm embodied in Table 1, five steps may be initially identified from control flow graph 402 including a step0={G5}, step1={A2, A4}, step2={A5, G2, G4}, step3={G1, A1, A3}, step4={G1, G3}, where A-values are stored in an accelerator task list and G-values are stored in a general-purpose task list. It is noted in this example that both step3 and step4 include G1. This is because G1 is a parent task 404 with respect to both A1 and A5, but A1 and A5 reside at different levels of the control flow graph 402. To remedy this issue, based on identifying a same task at different steps in the general-purpose task list or the accelerator task list, the same task can be discarded from a step that is closer to the last task in the general-purpose task list or the accelerator task list. For instance, since step3 is closer to step0 that includes the last task 414, G1 can be removed from step3 and retained in step4.

In order to maintain idle phases in either the main processor 102 or the accelerator chip 104, there cannot be a mix of both general-purpose tasks and accelerator tasks in the same step (i.e., a dual task type step), as is the case in step2 in this example. To locate dual task type steps, the general-purpose task list and the accelerator task list can be analyzed on a stepwise basis for a dual task type step that includes at least one general-purpose task and at least one accelerator task assigned to a same step. Based on identifying the dual task type step, the dual task type step can be split into a first step (e.g., step2.1) and a second step (e.g., step2.2), and tasks of the dual task type step can be assigned to the first step and the second step to align with either or both of: a same task type occurring in an immediately prior step before the dual task type step and a next step after the dual task type step. In other words, since step2 contains {A5, G2, G4}, step1 and/or step3 can be analyzed to determine an efficient split order to continue with the same task type as in the previous step (step3-which now only includes {A1, A3}) and/or for consistency with the next step (step1-which includes {A2, A4}). In this example, step2 is split such that A5 is performed prior to G2 and G4. The resulting steps are depicted in the clustered control flow graph 502, where steps 504, 506, 508, 510, 512, and 514 are ordered to maintain data dependency of the control flow graph 402. Step 504 includes G1 and G3 (i.e., step4); step 506 includes A1 and A3 (i.e., step3); step 508 includes A5 (i.e., step2.1); step 510 includes G2 and G4 (i.e., step 2.2); step 512 includes A2 and A4 (i.e., step1); and, step 514 includes G5 (i.e., step0).

Figure 6:
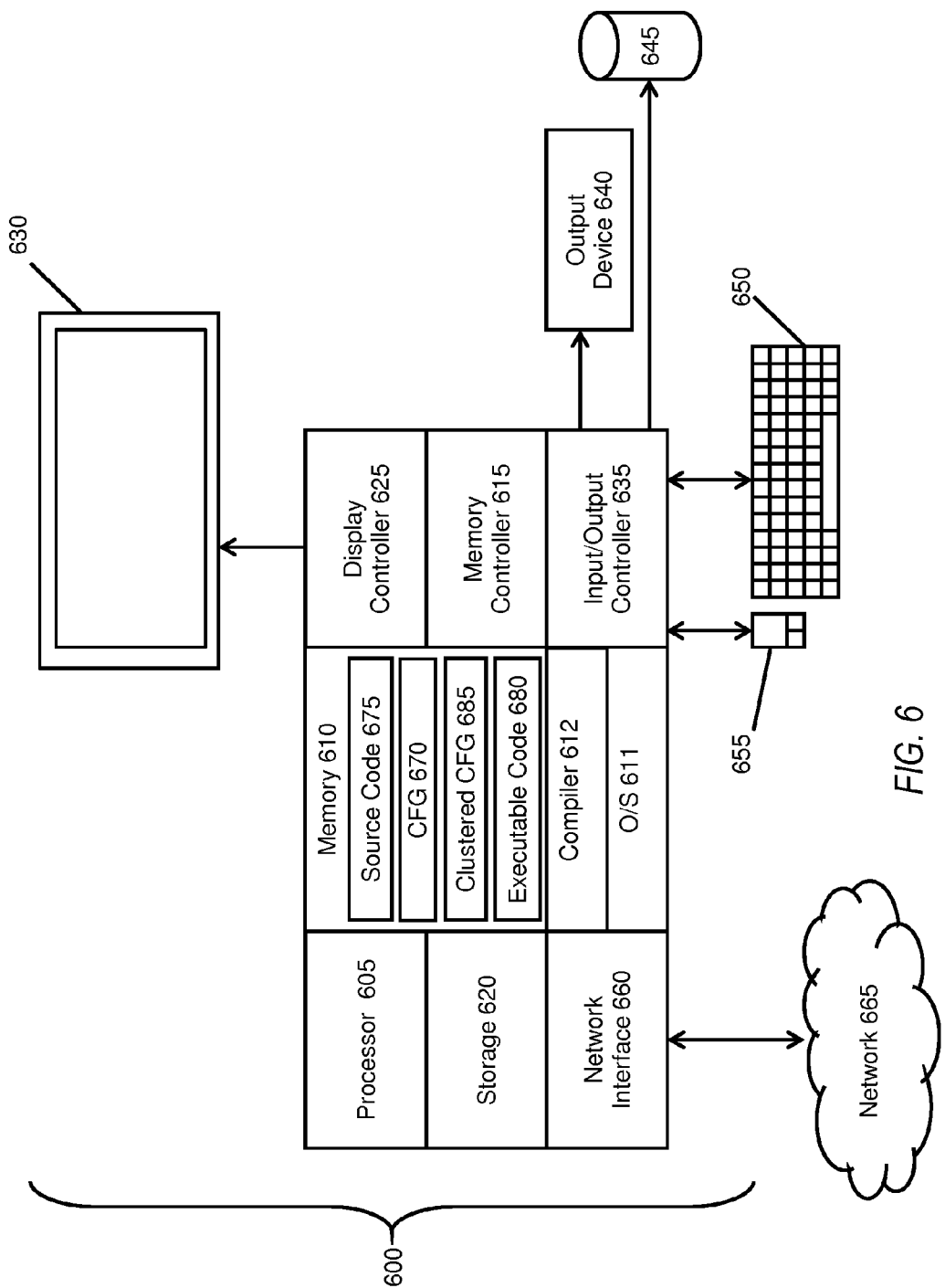
FIG. 6 illustrates a block diagram of another system in accordance with an embodiment.

FIG. 6 illustrates a block diagram of a computer system 600 for use in clustering execution of tasks according to some embodiments. The systems and methods described herein may be implemented in hardware, software (e.g., firmware), or a combination thereof. In some embodiments, the methods described may be implemented, at least in part, in hardware and may be part of the microprocessor of a computer system 600, such as a personal computer, workstation, minicomputer, tablet computer, mobile device, or mainframe computer. The computer system 600 is also referred to as processing system 600 and can be equipped with additional software and hardware to support software development and execution for a variety of target system. The computer system 600 can be a separate development system targeting application development for the computer system 100 of FIG. 1, or the computer system 600 may be an embodiment of the computer system 100 of FIG. 1.

In some embodiments, as shown in FIG. 6, the computer system 600 includes a processor 605, physical memory 610 coupled to a memory controller 615, and one or more input devices 645 and/or output devices 640, such as peripherals, that are communicatively coupled power via a local I/O controller 635. These devices 640 and 645 may include, for example, a printer, a scanner, a microphone, and the like. Input devices such as a conventional keyboard 650 and mouse 655 may be coupled to the I/O controller 635. The I/O controller 635 may be, for example, one or more buses or other wired or wireless connections, as are known in the art. The I/O controller 635 may have additional elements, which are omitted for simplicity, such as controllers, buffers (caches), drivers, repeaters, and receivers, to enable communications.

The I/O devices 640, 645 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 605 is a hardware device for executing hardware instructions or software, particularly those stored in the physical memory 610. The processor 605 may be a custom made or commercially available processor, a central processing unit (CPU), an auxiliary processor among several processors associated with the computer system 600, a semiconductor based microprocessor (in the form of a microchip or chip set), a macroprocessor, or other device for executing instructions.

The memory 610 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 610 may incorporate electronic, magnetic, optical, or other types of storage media. Note that the memory 610 may have a distributed architecture, where various components are situated remote from one another but may be accessed by the processor 605.

The instructions in memory 610 may include one or more separate programs, each of which comprises an ordered listing of executable instructions for implementing logical functions, as well as files and data structures. In the example of FIG. 6, the instructions in the memory 610 include a suitable operating system (OS) 611. The operating system 611 essentially may control the execution of other computer programs and provides scheduling, input-output control, file and data management, memory management, power management, and communication control and related services.

Additional data, including, for example, instructions for the processor 605 or other retrievable information, may be stored in storage 620, which may be a storage device such as a hard disk drive or solid state drive.

The computer system 600 may further include a display controller 625 coupled to a display 630. In some embodiments, the computer system 600 may further include a network interface 660 for coupling to a network 665.

Systems and methods according to this disclosure may be embodied, in whole or in part, in computer program products or in computer systems 600, such as that illustrated in FIG. 6. For example, a compiler 612 can include functionality according to the methods described herein for clustering execution of tasks by analyzing a control flow graph 670 developed during compilation of source code 675 in the process of generating executable code 680 of an application and modifying an execution sequence of the tasks in the control flow graph 670 to produce a clustered control flow graph 685. The compiler 612 may be comprised of program instructions executable by the processor 605. The compiler 612 can be stored in a computer readable storage medium such as the memory 610 and/or storage 620. Similarly, the control flow graph 670, source code 675, executable code 680, and clustered control flow graph 685 can be stored in a computer readable storage medium such as the memory 610 and/or storage 620. The control flow graph 670 and/or source code 675 may be received over the network 665, and the executable code 680 and/or clustered control flow graph 685 can be transmitted over the network 665 for distribution to a targeted system, such as the computer system 100 of FIG. 1. Although only a single control flow graph 670 and clustered control flow graph 685 are depicted in FIG. 6, it will be understood that each instance of executable code 680 for a variety of applications can have an associated clustered control flow graph 685.

Figure 7:
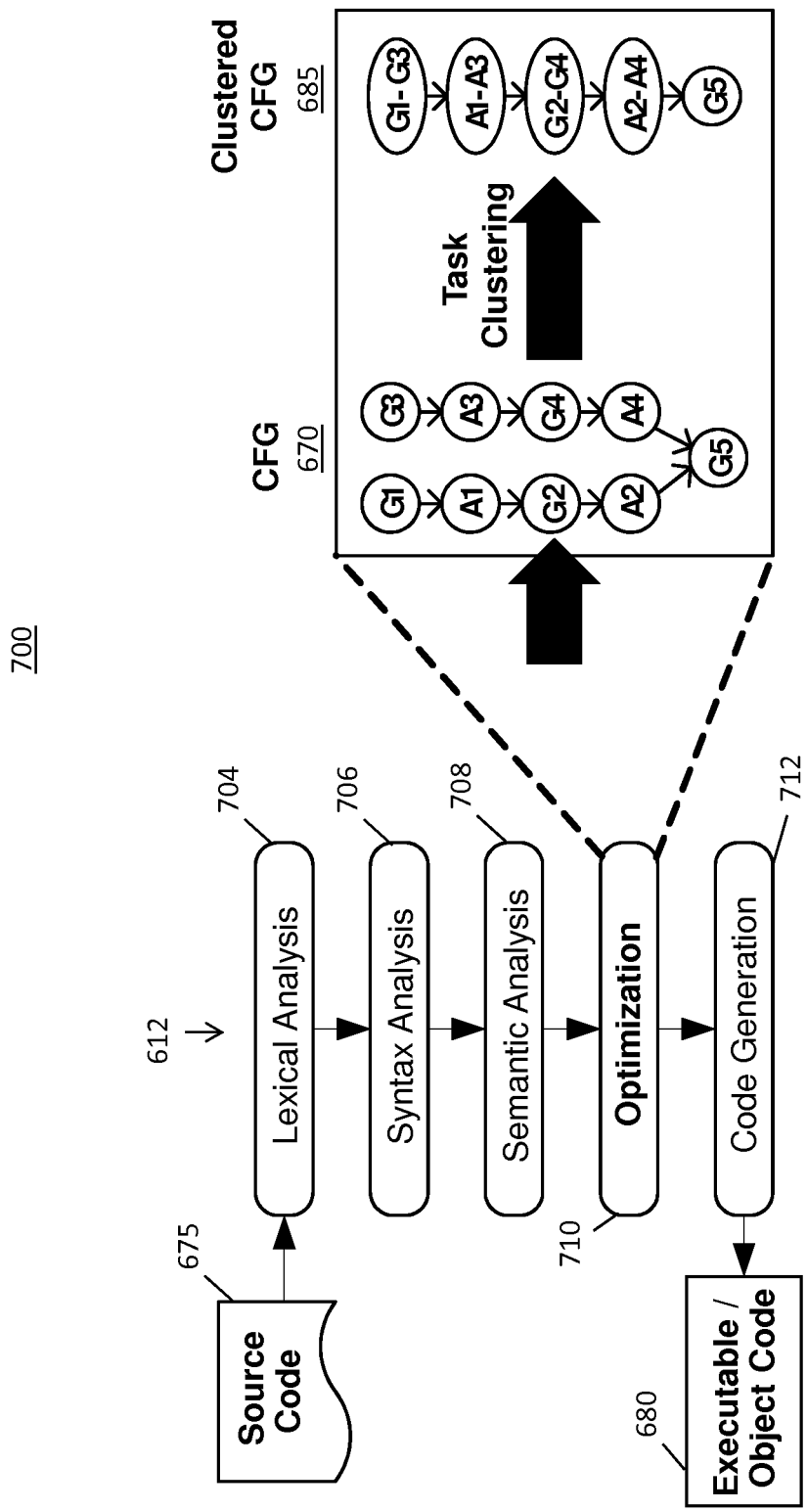
FIG. 7 illustrates stages of compiling source code of an application in accordance with an embodiment.

FIG. 7 illustrates stages 700 of compiling source code of an application in accordance with an embodiment. As one example, compiler 612 can perform a lexical analysis stage 704 on source code 675 followed by a syntax analysis stage 706, a semantic analysis stage 708, an optimization stage 710, and a code generation stage 712 to produce executable code 680 for an application (which may be formatted as object code prior to linking) As part of the analysis actions in stages 704-708, the compiler 612 can produce control flow graph 670 using techniques known in the art. The optimization stage 710 can include logic to implement, for instance, the pseudo-code of Table 1 and other functions as described herein to generate the clustered control flow graph 685 based on the control flow graph 670. Control flow graphs 202 and 402 of FIGS. 2 and 4 are examples of the control flow graph 670. Clustered control flow graphs 302 and 502 of FIGS. 3 and 5 are examples of the clustered control flow graph 685.

FIG. 8 illustrates a process 800 of clustering execution of tasks in a processing system in accordance with an embodiment. The process 800 can be performed by the compiler 612 executing on the processor 605 of FIG. 6 or the computer system 100 of FIG. 1, and the process 800 is further described in reference to FIGS. 1-7 for purposes of explanation. However, the process 800 of FIG. 8 can be implemented on systems with alternate configurations and elements beyond those depicted in the examples of FIGS. 1-7. The process 800 may be performed by compiler 612 as part of an optimization stage 710 when compiling source code 675 of the application.

At block 802, a control flow graph 670 that defines a data dependency and an execution sequence of a plurality of tasks of an application that executes on a plurality of system components. The system components can include a main processor 102 and an accelerator chip 104. The tasks can be functions, procedures, modules, threads, thread groups, or other sub-divisions of code as recognized by an operating system, such as operating system 611. As a further example, each of the tasks to be executed on the main processor 102 may represent one or more threads to be executed in parallel in one or more cores 106 of the main processor 102 during an active phase of the one or more cores 106. The application can be executable code 680 for execution on computer system 100 of FIG. 1.

At block 804, the execution sequence of the tasks in the control flow graph 670 is modified as a clustered control flow graph 685 that clusters active and idle phases of a system component while maintaining the data dependency. Modifying the execution sequence of the tasks in the control flow graph 670 can further include delaying of spawning of one or more of the tasks from the main processor 102 to the accelerator chip 104 to create extended bursts of activity on the main processor 102, extended bursts of activity on the accelerator chip 104, and extended corresponding idle periods.

At block 806, the clustered control flow graph 685 is sent to an operating system (e.g., an operating system of the computer system 100 or operating system 611 of computer system 600), where the operating system utilizes the clustered control flow graph 685 for scheduling the tasks. For instance, the operating system can command power gating or dynamic voltage-frequency scaling on the idle system component (e.g., main processor 102 or accelerator chip 104) as task execution commences based on the clustered control flow graph 685.

Figure 9:
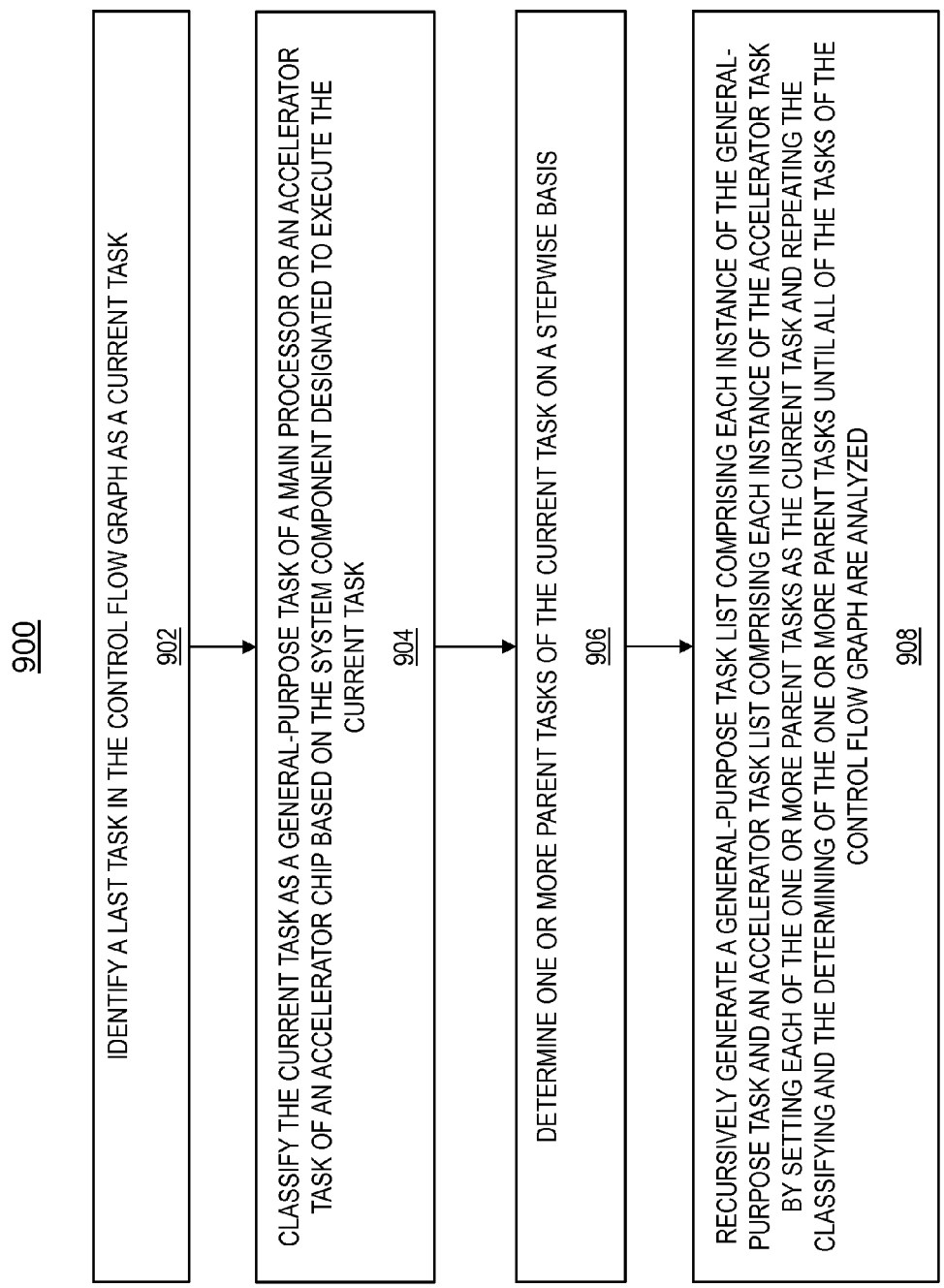
FIG. 9 illustrates a process of clustering tasks in a control flow graph in accordance with an embodiment.

FIG. 9 illustrates a process 900 of clustering tasks in a control flow graph in accordance with an embodiment. The process 900 can be performed by compiler 612 and may be merged with the process 800 of FIG. 8. The process 900 is further described in reference to FIGS. 1-7.

At block 902, a last task in a control flow graph is identified as a current task, such as last task 414 of control flow graph 402 of FIG. 4. At block 904, the current task is classified as a general-purpose task of the main processor 102 or an accelerator task of the accelerator chip 104 based on the system component designated to execute the current task. At block 906, one or more parent tasks of the current task are determined on a stepwise basis.

At block 908, a general-purpose task list is recursively determined including each instance of the general-purpose task and an accelerator task list including each instance of the accelerator task by setting each of the one or more parent tasks as the current task and repeating the classifying and the determining of the one or more parent tasks until all of the tasks of the control flow graph are analyzed. The general-purpose task list and the accelerator task list are analyzed on a stepwise basis for a dual task type step that includes at least one general-purpose task and at least one accelerator task assigned to a same step. Based on identifying the dual task type step, the dual task type step can be split into a first step and a second step, and tasks of the dual task type step can be assigned to the first step and the second step to align with either or both of: a same task type occurring in an immediately prior step before the dual task type step and a next step after the dual task type step. Based on identifying a same task at different steps in the general-purpose task list or the accelerator task list, the same task can be discarded from a step that is closer to the last task in the general-purpose task list or the accelerator task list.

Technical effects and benefits include increasing opportunities for power savings potential by clustering execution of tasks to have longer periods of sustained activity in different system components while still maintaining data dependencies between the tasks.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A system comprising a processor, the system configured to perform a method comprising:
    accessing a control flow graph that defines a data dependency and an execution sequence of a plurality of tasks of an application that executes on a plurality of system components comprising a main processor and an accelerator chip, wherein the execution sequence in the control flow graph comprises the tasks scheduled to be executed by the main processor interleaved with one or more of the tasks scheduled to be executed by the accelerator chip with the data dependency between the main processor and the accelerator chip in the execution sequence;
    modifying, by the processor, the execution sequence of the tasks in the control flow graph as a clustered control flow graph that clusters active and idle phases of a system component while maintaining the data dependency and reducing a control transfer frequency between the main processor and the accelerator chip, and the clustered control flow graph combines non-successive tasks of the execution sequence in a same cluster to be executed by one of the main processor and the accelerator chip in a same active phase while the other of the main processor and the accelerator chip is idle; and
    sending the clustered control flow graph to an operating system, wherein the operating system utilizes the clustered control flow graph for scheduling the tasks.

2. The system of claim 1, wherein modifying the execution sequence of the tasks in the control flow graph further comprises delaying of spawning of one or more of the tasks from the main processor to the accelerator chip to create extended bursts of activity on the main processor, extended bursts of activity on the accelerator chip, and extended corresponding idle periods.

3. The system of claim 1, wherein the system is further configured to perform:
    identifying a last task in the control flow graph as a current task;
    classifying the current task as a general-purpose task of the main processor or an accelerator task of the accelerator chip based on the system component designated to execute the current task;
    determining one or more parent tasks of the current task on a stepwise basis; and
    recursively generating a general-purpose task list comprising each instance of the general-purpose task and an accelerator task list comprising each instance of the accelerator task by setting each of the one or more parent tasks as the current task and repeating the classifying and the determining of the one or more parent tasks until all of the tasks of the control flow graph are analyzed.

4. The system of claim 3, wherein based on identifying a same task at different steps in the general-purpose task list or the accelerator task list, the same task is discarded from a step that is closer to the last task in the general-purpose task list or the accelerator task list.

5. The system of claim 3, wherein the system is further configured to perform:
    analyzing the general-purpose task list and the accelerator task list on a stepwise basis for a dual task type step comprising at least one general-purpose task and at least one accelerator task assigned to a same step; and
    based on identifying the dual task type step, splitting the dual task type step into a first step and a second step, and assigning tasks of the dual task type step to the first step and the second step to align with either or both of: a same task type occurring in an immediately prior step before the dual task type step and a next step after the dual task type step.

6. The system of claim 1, wherein each of the tasks to be executed on the main processor comprises one or more threads to be executed in parallel in one or more cores of the main processor during an active phase of the one or more cores.

7. The system of claim 1, further comprising a compiler that performs the method as part of an optimization stage when compiling source code of the application.

8. A computer program product comprising:
    a non-transitory computer readable storage medium having program instructions embodied therewith, the program instructions readable by a processing circuit to cause the processing circuit to perform a method comprising:
    accessing a control flow graph that defines a data dependency and an execution sequence of a plurality of tasks of an application that executes on a plurality of system components comprising a main processor and an accelerator chip, wherein the execution sequence in the control flow graph comprises the tasks scheduled to be executed by the main processor interleaved with one or more of the tasks scheduled to be executed by the accelerator chip with the data dependency between the main processor and the accelerator chip in the execution sequence;
    modifying the execution sequence of the tasks in the control flow graph as a clustered control flow graph that clusters active and idle phases of a system component while maintaining the data dependency and reducing a control transfer frequency between the main processor and the accelerator chip, and the clustered control flow graph combines non-successive tasks of the execution sequence in a same cluster to be executed by one of the main processor and the accelerator chip in a same active phase while the other of the main processor and the accelerator chip is idle; and sending the clustered control flow graph to an operating system, wherein the operating system utilizes the clustered control flow graph for scheduling the tasks.

9. The computer program product of claim 8, wherein modifying the execution sequence of the tasks in the control flow graph further comprises delaying of spawning of one or more of the tasks from the main processor to the accelerator chip to create extended bursts of activity on the main processor, extended bursts of activity on the accelerator chip, and extended corresponding idle periods.

10. The computer program product of claim 9, wherein the program instructions further cause the processing circuit to perform:

identifying a last task in the control flow graph as a current task;

classifying the current task as a general-purpose task of the main processor or an accelerator task of the accelerator chip based on the system component designated to execute the current task;

determining one or more parent tasks of the current task on a stepwise basis; and recursively generating a general-purpose task list comprising each instance of the general-purpose task and an accelerator task list comprising each instance of the accelerator task by setting each of the one or more parent tasks as the current task and repeating the classifying and the determining of the one or more parent tasks until all of the tasks of the control flow graph are analyzed.

11. The computer program product of claim 10, wherein the program instructions further cause the processing circuit to perform:

based on identifying a same task at different steps in the general-purpose task list or the accelerator task list, discarding the same task from a step that is closer to the last task in the general-purpose task list or the accelerator task list;

analyzing the general-purpose task list and the accelerator task list on a stepwise basis for a dual task type step comprising at least one general-purpose task and at least one accelerator task assigned to a same step; and based on identifying the dual task type step, splitting the dual task type step into a first step and a second step, and assigning tasks of the dual task type step to the first step and the second step to align with either or both of: a same task type occurring in an immediately prior step before the dual task type step and a next step after the dual task type step.

12. The computer program product of claim 8, wherein each of the tasks to be executed on the main processor comprises one or more threads to be executed in parallel in one or more cores of the main processor during an active phase of the one or more cores.

13. The computer program product of claim 8, wherein the program instructions are part of an optimization stage of a compiler executable when compiling source code of the application.

* * * * *